United States Patent
Saccoccio et al.

(10) Patent No.: US 11,536,044 B2
(45) Date of Patent: Dec. 27, 2022

(54) MULTIPORT PUMP AND ADAPTER KIT

(71) Applicant: Asia Connection LLC, New York, NY (US)

(72) Inventors: Mitch Saccoccio, Clarksville, VA (US); Jonathan Bonelli, New York, NY (US); Reza Afshar, Westlake Village, CA (US)

(73) Assignee: Asia Connection LLC, New York, NY (US)

( * ) Notice: Subject to any disclaimer, the term of this patent is extended or adjusted under 35 U.S.C. 154(b) by 361 days.

(21) Appl. No.: 16/820,099

(22) Filed: Mar. 16, 2020

(65) Prior Publication Data

US 2020/0299985 A1    Sep. 24, 2020

Related U.S. Application Data

(60) Provisional application No. 62/821,523, filed on Mar. 21, 2019.

(51) Int. Cl.
| | |
|---|---|
| *F04D 29/42* | (2006.01) |
| *F04D 29/70* | (2006.01) |
| *F04D 29/58* | (2006.01) |
| *F04D 1/00* | (2006.01) |
| *E04H 4/12* | (2006.01) |
| *F16L 55/115* | (2006.01) |

(52) U.S. Cl.
CPC ............. *E04H 4/1245* (2013.01); *F04D 1/00* (2013.01); *F04D 29/4293* (2013.01); *F04D 29/5806* (2013.01); *F04D 29/708* (2013.01); *F16L 55/1152* (2013.01); *F05B 2240/14* (2013.01)

(58) Field of Classification Search
CPC ......... F16L 55/1152; F16L 25/14; E04H 4/12; E04H 4/1245; F04D 29/5806; F04D 29/708; F04D 1/00; F04D 29/4293; F05B 2240/14
See application file for complete search history.

(56) References Cited

U.S. PATENT DOCUMENTS

| | | | | |
|---|---|---|---|---|
| 3,851,993 | A * | 12/1974 | Foster | A47L 15/4225 |
| | | | | 415/203 |
| 3,947,154 | A * | 3/1976 | Klepp | F04D 29/426 |
| | | | | 417/372 |
| 7,156,617 | B2 * | 1/2007 | Rossman | F04D 29/4293 |
| | | | | 415/206 |
| 9,714,665 | B2 | 7/2017 | Saccoccio et al. | |
| 10,323,651 | B2 | 6/2019 | Saccoccio et al. | |
| 2003/0133811 | A1 * | 7/2003 | Yen | F04D 29/628 |
| | | | | 417/360 |
| 2003/0188772 | A1 * | 10/2003 | Jenkins | F04D 15/0072 |
| | | | | 134/188 |
| 2019/0048875 | A1 * | 2/2019 | Mayleben | F04D 29/4293 |
| 2019/0219064 | A1 | 7/2019 | Saccoccio et al. | |

* cited by examiner

*Primary Examiner* — Igor Kershteyn
(74) *Attorney, Agent, or Firm* — Dilworth & Barrese, LLP

(57) ABSTRACT

A multiport pump and adapter kit for use with a water circulation system for a body of water includes a centrifugal pump assembly having a plurality of outlet ports oriented in different directions and at least one adapter having a first open end configured and dimensioned to be removably connectable to one of said outlet ports, a second open end configured and dimensioned to be removably connectable to a water circulation system, and a hollow body connecting the first open end and the second open end.

20 Claims, 9 Drawing Sheets

MULTIPORT PUMP AND ADAPTER KIT

BACKGROUND OF THE INVENTION

The present invention relates to multiport pump and adapter kits and, more particularly, to multiport pump and adapter kits for use in connection with water circulation systems for swimming pools, spas and other recreational bodies of water.

Numerous pumps have been developed in the past for use in connection with water circulation systems for swimming pools, spas, whirlpools and the like. A pump should adapt easily to the specific configuration of an existing water circulation system. For example, a return line of the water circulation system needs to be connected to a pump outlet having a position horizontally, vertically, or in any position therebetween. However, the outlets of many conventional pumps may not be compatible with the return lines of the wide variety of configurations of the water circulation systems on the market. Therefore, customers may be uncertain about whether one particular pump would correctly fit with a water circulation system. For example, in one situation, customers trying to utilize an exist water circulation system may have difficulty finding a compatible pump. In another situation, replacing one piece of broken equipment, for example, a pump, may require the customers to replace the entire filtration system due to compatibility issues.

Accordingly, there is a need for multiport pump and adapter kits which are universally compatible with different configurations of the water circulation systems.

SUMMARY OF THE INVENTION

Provided herein is a kit for use with a water circulation system for a body of water which can include a centrifugal pump assembly having a casing, a plurality of outlet ports in continuous fluid communication with an interior of said casing and oriented in different directions along a same plane, an axially-extending aperture arranged to receive a rotatable shaft power and positioned substantially perpendicular to the plane defined by the outlet ports; and at least one adapter having a first open end configured and dimensioned to be removably connectable to one of said outlet ports of said centrifugal pump assembly, a second open end configured and dimensioned to be removably connectable to a water circulation system, and a hollow body connecting the first open end and the second open end. The kit may further comprise at least one cap, a strainer assembly and a motor.

BRIEF DESCRIPTION OF THE DRAWINGS

Various embodiments are described below with reference to the drawings wherein.

Like reference numerals indicate similar parts throughout the figures.

DETAILED DESCRIPTION OF PREFERRED EMBODIMENT(S)

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present invention, which are illustrated in the accompanying figures.

The multiport pump and adapter kit described herein includes a centrifugal pump assembly which has a casing, a plurality of outlet ports in continuous fluid communication with an interior of said casing and oriented in different directions along a same plane, an axially-extending aperture arranged to receive a rotatable shaft power and positioned substantially perpendicular to the plane defined by the outlet ports; and at least one adapter having a first open end configured and dimensioned to be removably connectable to one of said outlet ports of said centrifugal pump assembly, a second open end configured and dimensioned to be removably connectable to a water circulation system, and a hollow body connecting the first open end and the second open end.

Figure 1:
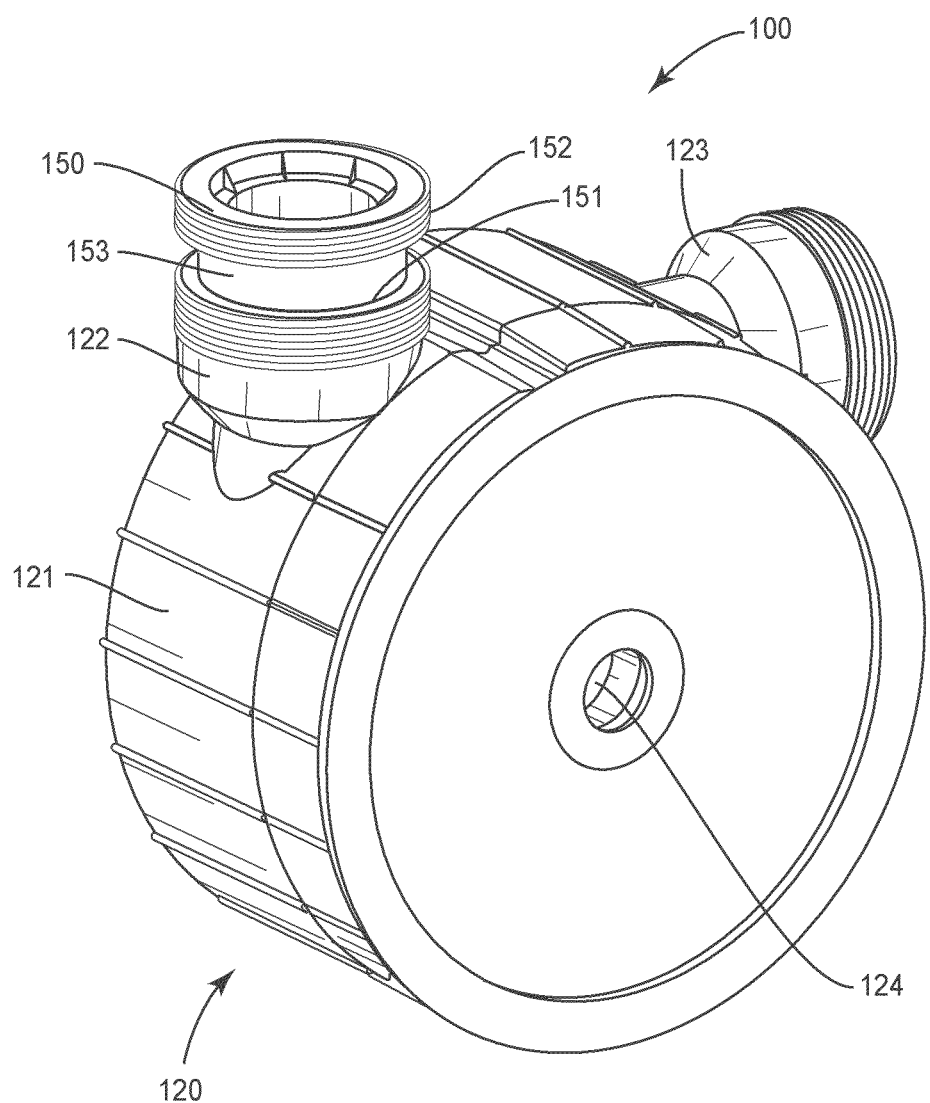
FIG. 1 is a perspective view of a first embodiment of the kit of the present invention.

Now referring to FIG. 1, the first embodiment of kit 100 of the present invention includes a centrifugal pump assembly 120 and at least one adapter 150. The centrifugal pump assembly 120 has a casing 121, a first outlet port 122, a second outlet port 123 and an axially-extending aperture 124. The first outlet port 122 and the second outlet port 123 are in continuous fluid communication with an interior of the casing 121 and oriented in different directions along a same plane. The axially-extending aperture 124 is arranged to receive a rotatable shaft power and positioned substantially perpendicular to the plane defined by the outlet ports 122 and 123. The adapter 150 has a first open end 151 configured and dimensioned to be removably connectable to one of said outlet ports of said centrifugal pump assembly, for example, the first outlet port 122, a second open end 152 configured and dimensioned to be removably connectable to a water circulation system (not shown), and a hollow body 153 connecting the first open end 151 and the second open end 152.

Figure 2:
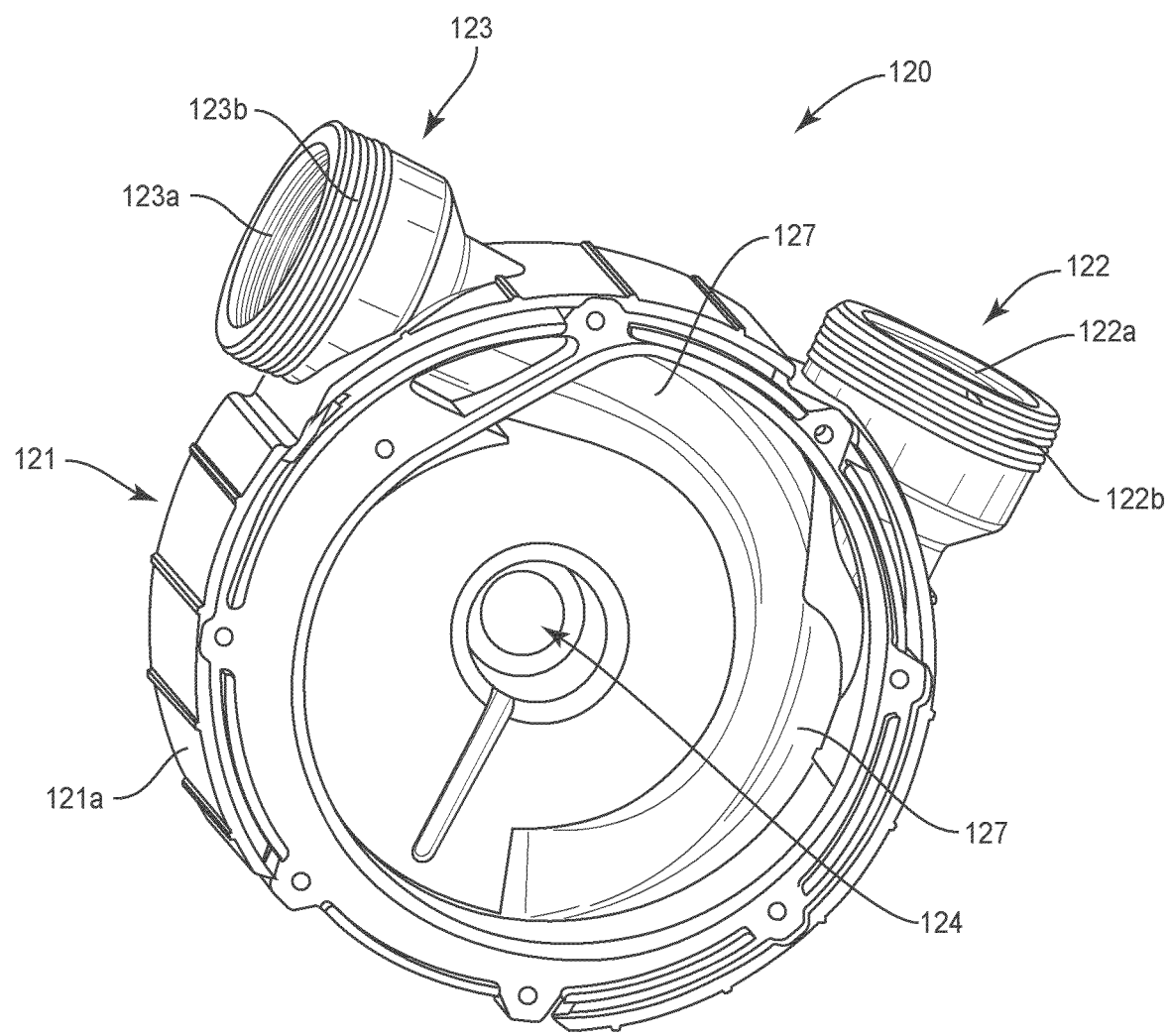
FIG. 2 is a perspective view of the outlet side of the centrifugal pump assembly.
Figure 3:
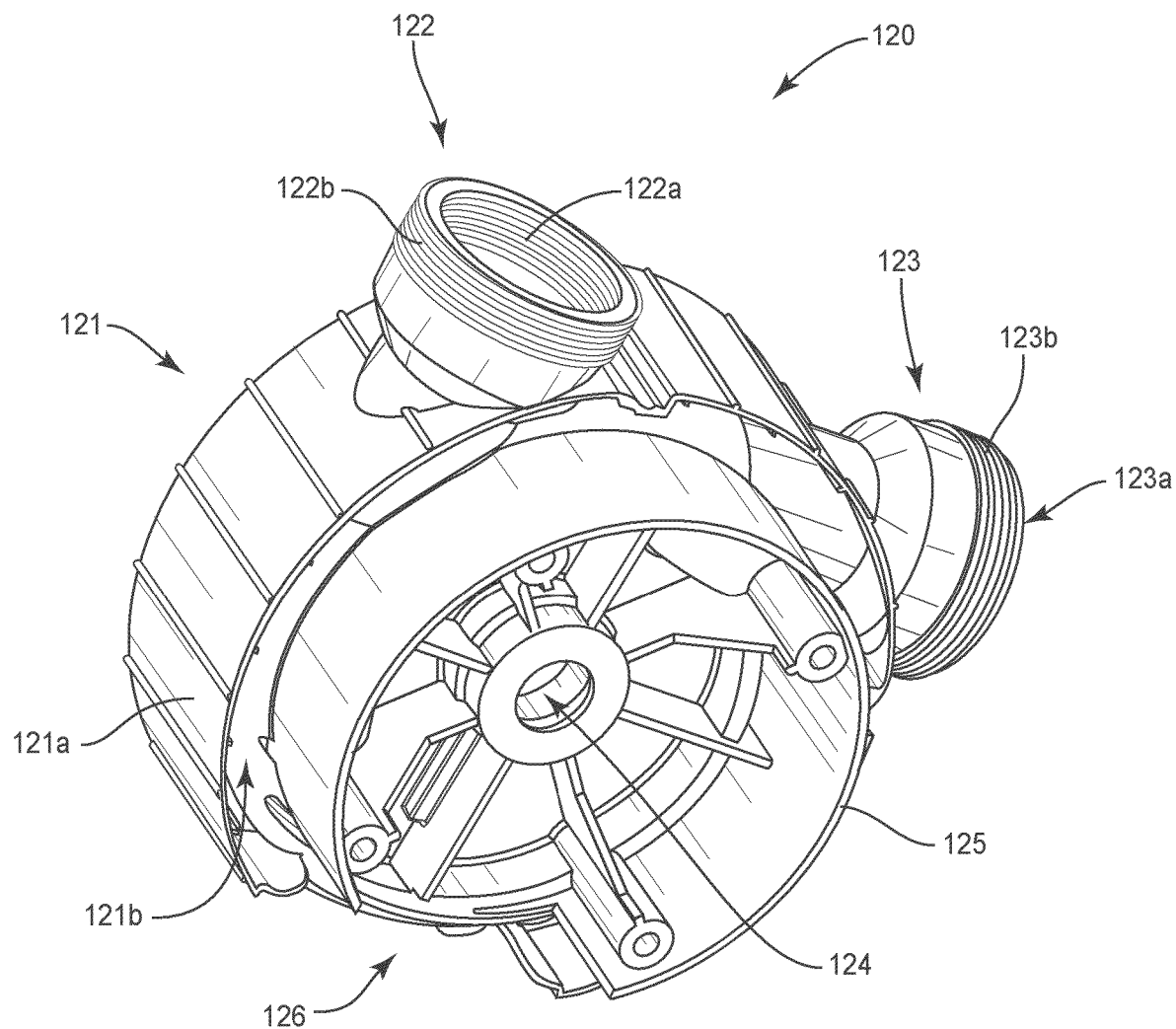
FIG. 3 is a perspective view of the inlet side of the centrifugal pump assembly.

FIG. 2 is a perspective view of the outlet side of the centrifugal pump assembly and FIG. 3 is a perspective view of the inlet side of the centrifugal pump assembly. As showing in FIG. 2 and FIG. 3, centrifugal pump assembly 120 includes a casing 121 having an outer shell 121*a* and an inner shell 121*b* (FIG. 3) concentrically disposed within outer shell 121*a* and spaced apart therefrom. Centrifugal pump assembly 120 includes a plurality of outlet ports for the end user to easily select the direction of fluid outlet. For example, as shown in FIG. 2, a first outlet port 122 and a second outlet port 123. First outlet port 122 can include an internal thread 122*a* and an external thread 122*b* and is oriented in a vertical direction. Second outlet port 123 can include an internal thread 123*a* and an external thread 123*b* and is oriented in a horizontal direction. Additional outlet ports can be incorporated in the centrifugal pump assembly to accommodate other outlet directions. Preferably, the outlet ports are of the same size and configuration, although they may be constructed of different sizes and configurations if desired. Axial aperture 124 is adapted to receive a rotatable shaft power, for example, from a motor, to operate the rotor of the centrifugal pump. Centrifugal pump assembly 130 also includes an annular housing extension 125 to cover a motor face. Housing extension 125 preferably has a slot 126 at the bottom to permit the passage of air to cool the motor. Also, if there is any leakage of water into centrifugal pump assembly 120, slot 126 facilitates its drainage. A channel 127 is formed into the outer circumference of the centrifugal pump assembly 120. Channel 127 connects with each outlet port 122 and 123. Channel 127 assists to direct the flow of water to and out of outlet ports 122 and 123.

Figure 5A:
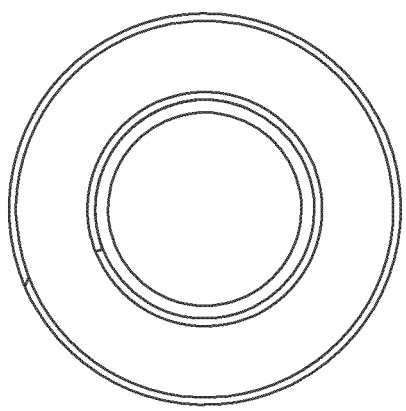
FIGS. 5A and 5B respectively illustrate axial end and perspective views of a second embodiment of the adapter of the present invention.
Figure 5B:
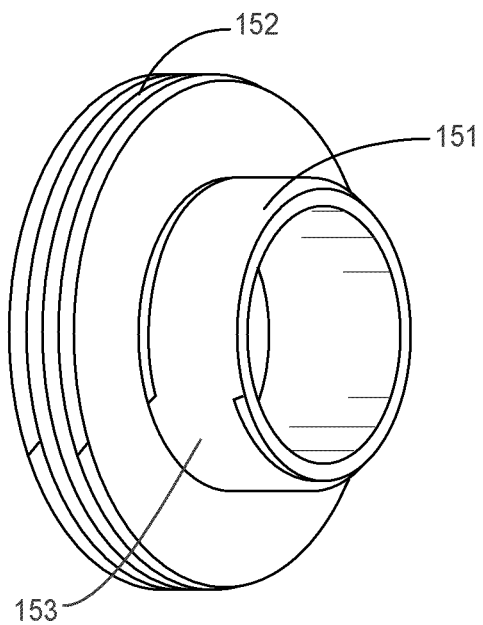
Figure 6A:
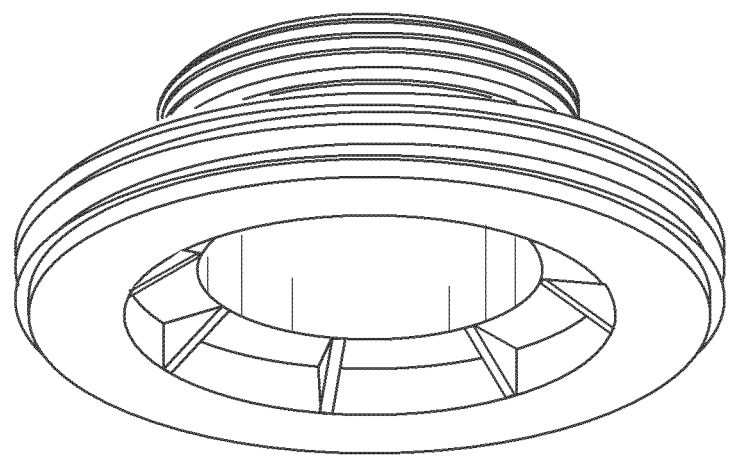
FIGS. 6A and 6B respectively illustrate perspective and side elevational views of a third embodiment of the adapter of the present invention.
Figure 6B:
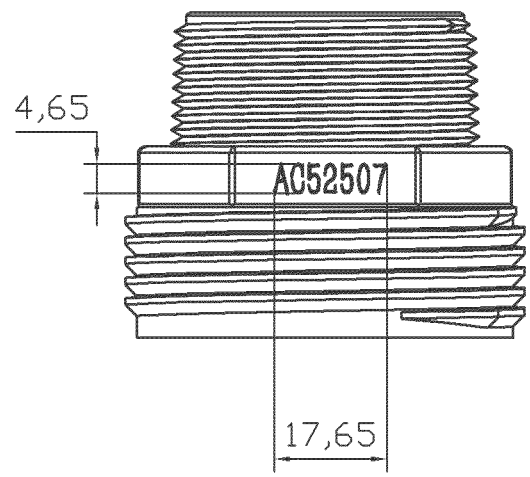
Figure 7A:
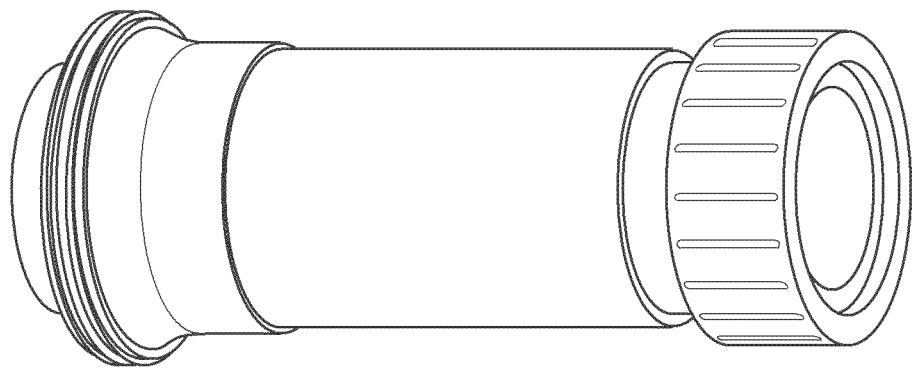
FIGS. 7A and 7b respectively illustrate perspective and side elevational views of a fourth embodiment of the adapter of the present invention.
Figure 7B:
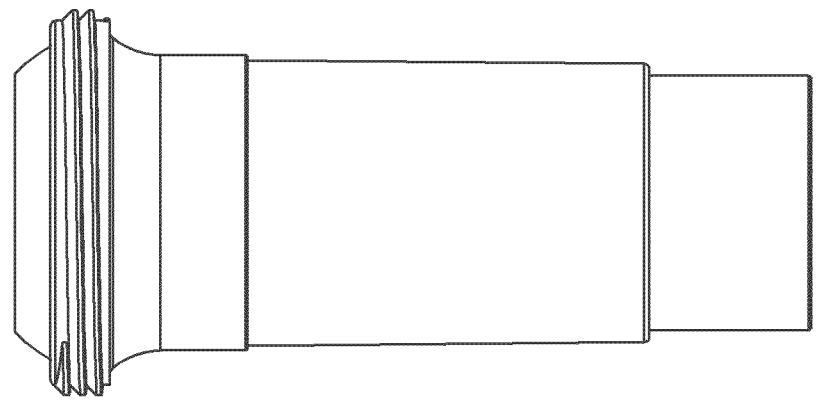

FIGS. 4-7 illustrate several embodiments of the adapter of the present invention. In particular, FIG. 4 demonstrates an adapter (AC 19070) for use together with Waterways® filter systems. FIG. 5 also demonstrates an adapter (AC 19070) for use together with Waterways® filter systems. FIG. 6 demonstrates an adapter (AC 52507) for use together with Pentair® sand filter systems. FIG. 7 demonstrates an adapter (AC 52558) for use together with Pentair® cartridge filter systems.

Figure 4A:
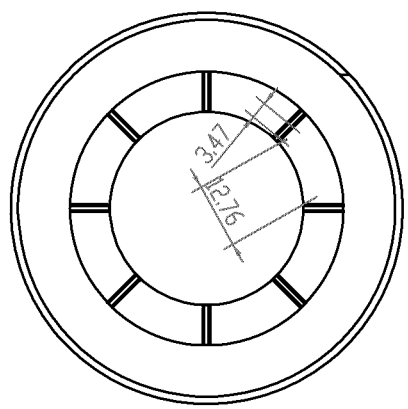
FIGS. 4A and 4B respectively illustrate axial end and perspective views of a first embodiment of the adapter of the present invention.
Figure 4B:
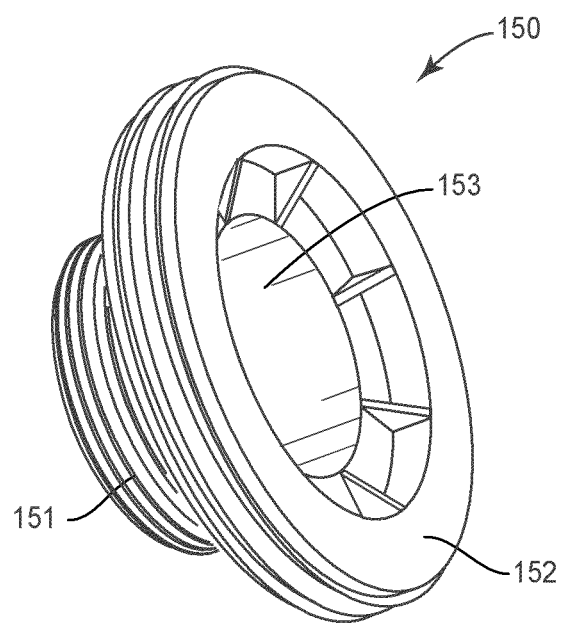

Referring to FIGS. 4A and 4B as an example, adapter 150 of the present invention has a first open end 151 configured and dimensioned to be removably connectable to one of outlet ports 122 or 123, a second open end 152 configured and dimensioned to be removably connectable to a water circulation system, and a hollow body 153 connecting the first open end 151 and the second open end 152.

Adapter 150 can include an internal thread and an external thread on either the first open end 151 or the second open end 152. For example, the adapter 150 showing in FIGS. 4A and 4B has external thread on both the first open end 151 and the second open end 152, and the adapter 150 showing in FIGS. 5A and 5B only has an external thread on the second open end 152.

Figure 8:
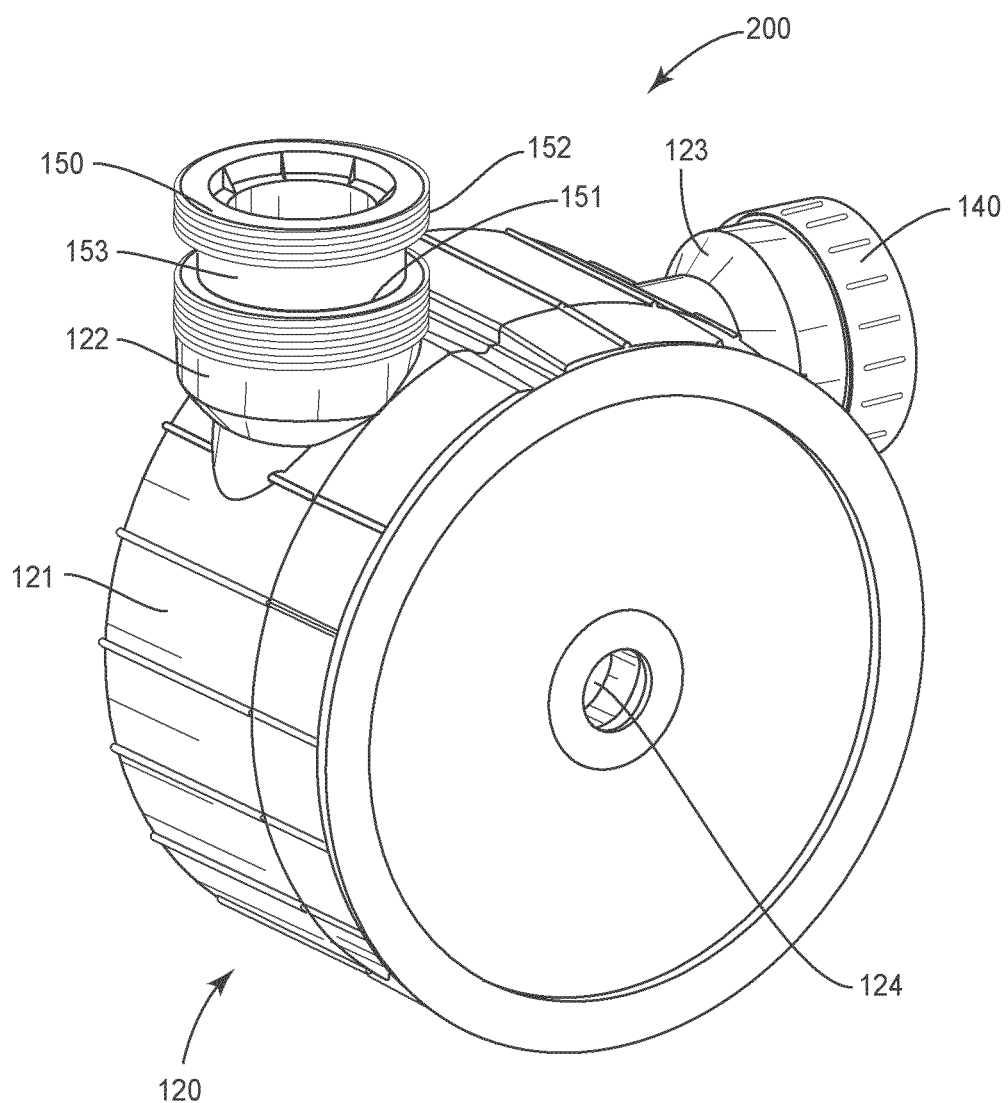
FIG. 8 is a perspective view of a second embodiment of the kit of the present invention.

FIG. 8 is a perspective view of a second embodiment of the kit of the present invention. The second embodiment of the kit 200 of the present invention includes at least one cap 140 configured and dimensioned to fit on and close at least one outlet port 122 or 123. Typically, cap 140 will have an internal thread configured and dimensioned to engage the external thread of the outlet port. However, it is also possible for the cap to have an external thread adapted to engage the internal thread of the outlet port to be closed. At least one cap 140 allows the end user to select the desired outlet without manually disengaging the centrifugal pump to change its configuration.

Figure 9:
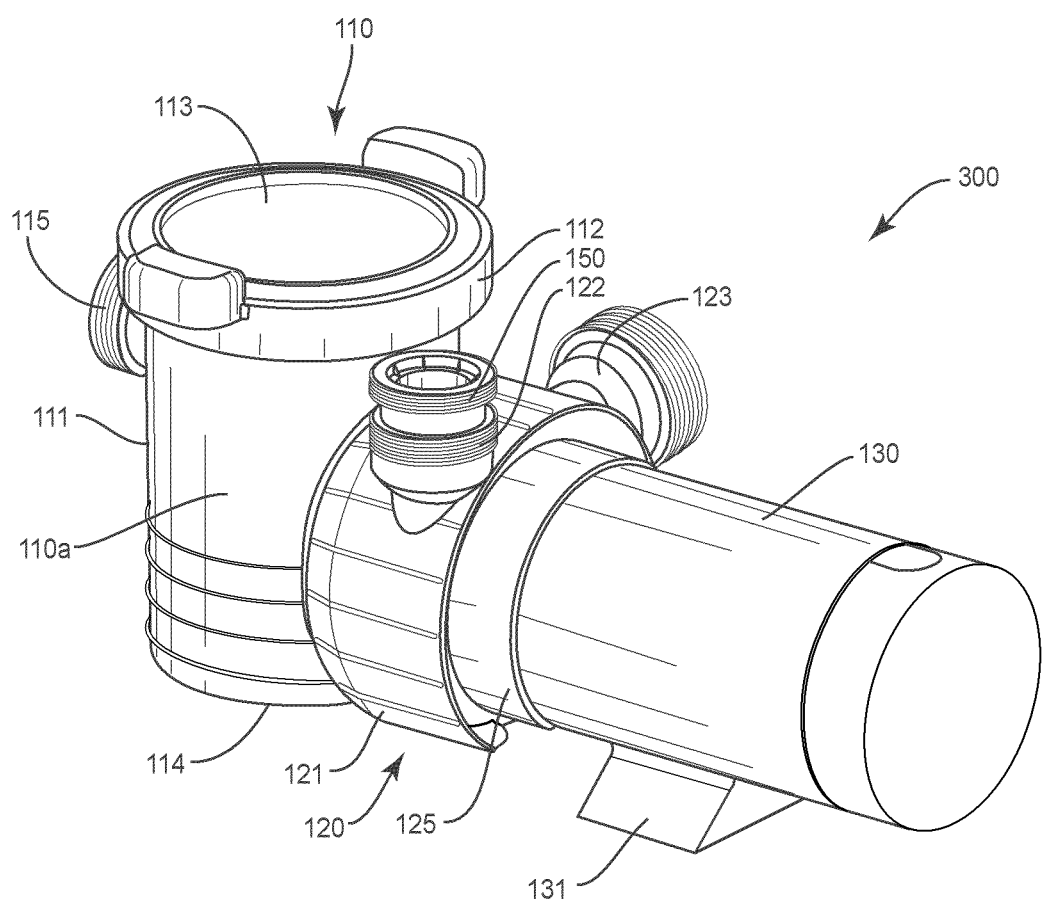
FIG. 9 illustrates a perspective view of a third embodiment of the kit of the present invention.

FIG. 9 illustrates a perspective view of a third embodiment of the kit of the present invention. Kit 300 of the present invention includes a centrifugal pump assembly 120, at least one adapter 150, a strainer assembly 110 and a motor 130. Strainer assembly 110 includes a strainer housing 110*a* that has a front side 111, a rear side 112, a top 113 and a bottom 114. An inlet 115 for water is positioned on front side 111 of the strainer housing. A strainer basket (not shown) is typically enclosed in strainer housing 110*a* and is employed to filter the water passing therethrough. An outlet (not shown) of the strainer assembly admits filtered water into centrifugal pump assembly 120.

The casing 121 of the centrifugal pump assembly 120 has a double outside shell to minimize expansion and obtain the benefit of thinner walls to save in material costs and minimize the visible internal shell expansion. The centrifugal pump housing is streamlined to improve performance. The front side of the centrifugal pump assembly is circular to have better water movement inside the pump. A housing extension 125 is provided to cover the motor face. The housing extension 125 also preferably has a slot at the bottom for the passage of air to cool the motor and for drainage of water in case of a leakage. Grounding plates for water bonding may be built into the swimming pool pump assembly to conform to state and federal ordinances. Motor 130 rests upon pedestal 131 and is a conventional pool pump motor.

Figure 10:
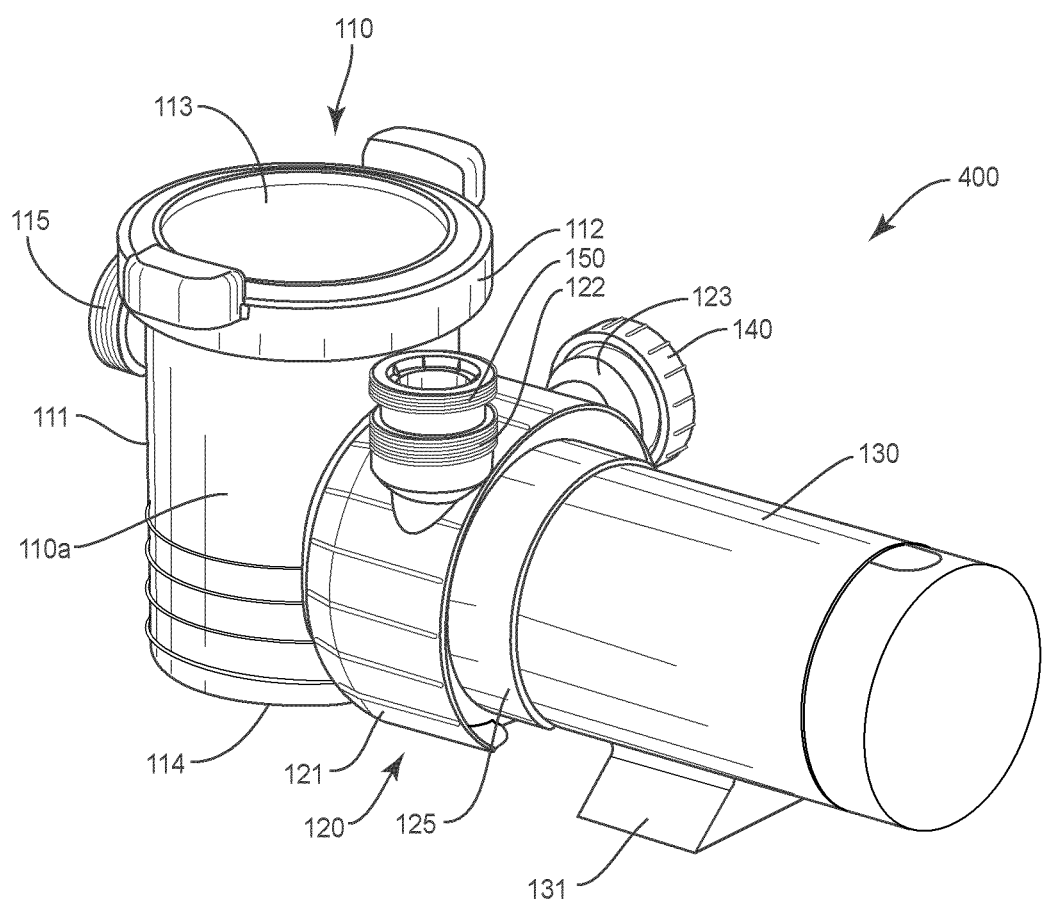
FIG. 10 illustrates a perspective view of a fourth embodiment of the kit of the present invention.

FIG. 10 illustrates a perspective view of a fourth embodiment of the kit of the present invention. Kit 400 of the present invention includes a centrifugal pump assembly 120, at least one cap 140, at least one adapter 150, a strainer assembly 110 and a motor 130.

The water circulation systems compatible with the kit of the present invention include Diatomaceous Earth filter system, cartridge filter system and sand filter system.

A significant feature of the invention is the flexibility given to the end user to select the desired water circulation systems or to fit with an existing water circulation system. For example, an end user having a broken pump that is connected to a specific type of water circulation system could only replace the pump with the kit of the present invention without purchasing a new water circulation system and be certain that the kit would be compatible with the water circulation system.

While the above description contains many specifics, these specifics should not be construed as limitations of the invention, but merely as exemplifications of preferred embodiments thereof. For example, the swimming pool pump assembly can be in connection with fluid circulation systems for swimming pools, spas, hot tubs, whirlpools, and any other bathing facilities. Those skilled in the art will envision many other embodiments within the scope and spirit of the invention as defined by the claims appended hereto.

What is claimed is:

1. A kit, comprising a centrifugal pump assembly having a casing, a plurality of outlet ports in continuous fluid communication with an interior of said casing without interruption and oriented in different directions along the same plane, an axially-extending aperture arranged to receive a rotatable shaft power and positioned substantially perpendicular to the plane defined by the outlet ports, and at least one adapter having a first open end configured and dimensioned to be removably connectable to one of said outlet ports of said centrifugal pump assembly, a second open end configured and dimensioned to be removably connectable to a water circulation system, and a hollow body connecting the first open end and the second open end, wherein the casing has an inner shell and an outer shell concentrically spaced apart from each other.

2. The kit of claim 1 further comprising at least one cap configured and dimensioned to engage and close one of said outlet ports of said centrifugal pump assembly.

3. The kit of claim 2, wherein the cap is configured to screw onto said outlet port having an internal thread or an external thread.

4. The kit of claim 1, wherein the water circulation system is selected from the group consisting of a diatomaceous earth filter system, cartridge filter system and sand filter system.

5. The kit of claim 1, wherein the rotatable shaft power is provided by a motor.

6. The kit of claim 1, wherein the centrifugal pump assembly is configured to mate with a strainer assembly on one side of the centrifugal pump assembly and mate with a motor on an opposite side of the centrifugal pump assembly.

7. The kit of claim 1, wherein said plurality of outlet ports are respectively oriented in vertical and horizontal positions.

8. The kit of claim 1, wherein at least one of said plurality of outlet ports has an internal thread and/or at least one of said plurality of outlet ports has an external thread.

9. The kit of claim 1, wherein the centrifugal pump assembly defines a channel positioned along an interior circumference and connected to each of the outlet ports.

10. The kit of claim 1, additionally comprising a motor configured to mate with the centrifugal pump assembly and providing said rotatable shaft power; and a strainer assembly configured to mate with the centrifugal pump assembly and introducing water filtered through the strainer assembly into the centrifugal pump assembly.

11. The kit of claim 1, wherein said water circulation system circulates water from a swimming pool.

12. The kit of claim 1, wherein said plurality of outlet ports continuously communicate with the interior of said casing without interruption.

13. The kit of claim 1, wherein each of said outlet ports is configured to be closed to direct fluid to the other outlet port.

14. The kit of claim 1, wherein said adapter comprises at least one of internal and external threads.

15. The kit of claim 1, wherein said adapter comprises an outer cylindrical circumference having sections with different outer diameters, a first said section configured to mate with one of said outlet ports, and a second said section configured to connect with the water circulation system.

16. The kit of claim 15, wherein said first and second sections each comprise external threads.

17. A kit comprising a centrifugal pump assembly having a casing, a plurality of outlet ports in continuous fluid communication with an interior of said casing without interruption and oriented in different directions along the same plane, an axially-extending aperture arranged to receive a rotatable shaft power and positioned substantially perpendicular to the plane defined by the outlet ports, at least one adapter having a first open end configured and dimensioned to be removably connectable to one of said outlet ports of said centrifugal pump assembly, a second open end configured and dimensioned to be removably connectable to a water circulation system, and a hollow body connecting the first open end and the second open end, and a housing extension configured to cover a face of a motor and including a slot at a bottom thereof to allow air flow to cool the motor.

18. The kit of claim 17 further comprising at least one cap configured and dimensioned to engage and close one of said outlet ports of said centrifugal pump assembly.

19. The kit of claim 18, wherein the cap is configured to screw onto said outlet port having an internal thread or an external thread.

20. The kit of claim 17, wherein the water circulation system is selected from the group consisting of a diatomaceous earth filter system, cartridge filter system and sand filter system.

* * * * *